Figure 2:
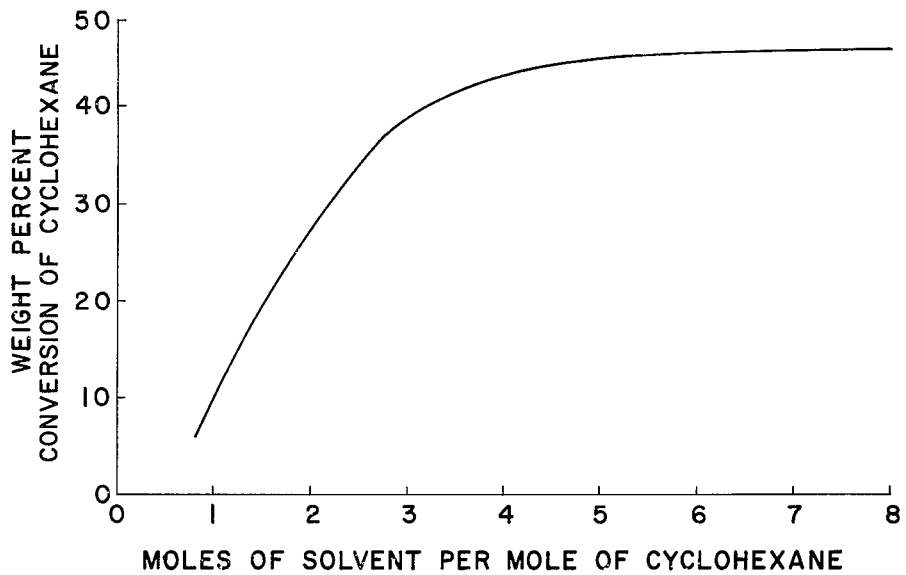

Jan. 25, 1966   J. KOLLAR   3,231,608
PREPARATION OF DIBASIC ACIDS
Filed Aug. 28, 1961

INVENTOR.
JOHN KOLLAR
BY
ATTORNEY

United States Patent Office 3,231,608
Patented Jan. 25, 1966

3,231,608
PREPARATION OF DIBASIC ACIDS
John Kollar, Pittsburgh, Pa., assignor to Gulf Research & Development Company, Pittsburgh, Pa., a corporation of Delaware
Filed Aug. 28, 1961, Ser. No. 134,276
16 Claims. (Cl. 260—533)

This invention relates to a process for the preparation of aliphatic dibasic acids.

Processes have previously been proposed for the oxidation of saturated cyclic hydrocarbons in one-step with an oxygen-containing gas to produce aliphatic dibasic acids. The prior one-step processes have been attended, however, either by low conversions or poor efficiencies, or both, resulting in either burdensome separation, multi-stage operations or in low overall yields of dibasic acids from the saturated cyclic hydrocarbon.

In accordance with the invention, it has been discovered that saturated cyclic hydrocarbons having from 4 to 8 cyclic carbon atoms per molecule can be oxidized with excellent conversions and efficiencies to produce aliphatic dibasic acids by reacting at least one of said saturated cyclic hydrocarbons in the liquid phase with an oxygen-containing gas in the presence of a solvent which comprises an aliphatic monobasic acid which contains only primary and secondary hydrogen atoms and a catalyst comprising a cobalt salt of an organic acid and in which process the molar ratio of said solvent to said saturated cyclic hydrocarbon is between 1.5:1 and 7:1 and in which process the molar ratio of said catalyst to said saturated cyclic hydrocarbon is at least 5 millimoles per mole. One preferred embodiment of this invention is based on the discovery that the induction period of the oxidation reaction can be reduced by the addition of an initiator comprising a compound which contains oxygen having a valence of minus one.

The charge stock for this reaction can be any saturated cyclic hydrocarbon having from 4 to 8 cyclic carbon atoms per molecule and which contains only primary and secondary hydrogen atoms in its structure. These saturated cyclic hydrocarbons include cyclobutane, cyclopentane, cyclohexane, cycloheptane, cyclooctane, or homologues thereof, which contain only primary and secondary hydrogen atoms in their structure. For example, suitable homologues would include 1,1-dimethyl cyclopentane, 1,1-diethyl cyclohexane and 1,1-diethyl cycloheptane. Unsuitable homologues would include 1,4-dimethyl cyclohexane, methylcyclopentane and isopropyl cycloheptane.

Any inert diluent, such as a hydrocarbon, which contains only primary and secondary hydrogens, may be present in the charge stock, but is preferably removed, especially if present in larger amounts since such diluent will occupy needed reactor space.

The solvent for this reaction can be any aliphatic monobasic acid which contains only primary and secondary hydrogen atoms in its structure. It is believed that the function of the solvent is to keep the catalyst in contact with the saturated cyclic hydrocarbon. It has been found that molar ratios of solvent to saturated cyclic hydrocarbon between 1.5:1 and 7:1 or more are satisfactory with preferred ratios being between 2:1 and 5:1. It has been found that increasing molar ratios of solvent to saturated cyclic hydrocarbon between the limits given provide unexpected improvements in promoting conversion of the saturated cyclic hydrocarbon. Undesirably low conversions result at molar ratios of solvent to saturated cyclic hydrocarbon below about 1.5:1. On the other hand, the conversion of the charge stock does not appear to increase at solvent to saturated hydrocarbon ratios above about 7:1 and, consequently, the yield of reaction products per reactor volume becomes undesirably low at solvent to saturated cyclic hydrocarbon ratios above about 7:1. Examples of satisfactory monobasic acid solvents for this reaction include acetic, propionic, normal butyric, caprylic, pelargonic, dimethylethyl-acetic, normal caproic and enanthic. Acetic acid is preferred since it is more readily available. Examples of unsuitable solvents which contain an undersirable tertiary hydrogen atom include isobutyric, isovaleric, isopropyl-methyl-acetic, 2-methyl pentanoic, 2-ethyl-hexanoic and cyclohexane carboxylic acids.

The function of the catalyst in this reaction is to increase the conversion and the efficiency of conversion of the saturated cyclic hydrocarbon to the desired aliphatic dibasic acid. The saturated cyclic hydrocarbon is believed to be converted initially by oxidation with an oxygen-containing gas into a cyclic hydroperoxide, which then decomposes into either a cyclic alcohol or a cyclic ketone. The cyclic ketone is readily convertible to the desired aliphatic dibasic acid by continued oxidation with an oxygen-containing gas while the cyclic alcohol resists further oxidation by this route. While the invention is not limited to any specific theory of reaction, it is believed that by employing a molar ratio of catalyst to saturated cyclic hydrocarbon of at least 5 millimoles per mole, the cyclic hydroperoxide is selectively decomposed to the desired cyclic ketone which is readily convertible by continued oxidation with an oxygen-containing gas to the desired aliphatic dibasic acid. Thus, excellent reaction efficiencies have been achieved, in that about 75 percent of the saturated cyclic hydrocarbon is converted to the desired aliphatic dibasic acids. These efficiencies are maintained even at the higher conversion levels of over 50 percent.

The catalyst for this reaction can be any cobalt salt of an organic acid. Examples of suitable catalysts include cobalt acetate, cobalt propionate and cobalt naphthenate. Materials which form such cobalt salts in situ can also be employed. For example, cobalt oxide and acetic acid are suitable since they will form cobalt acetate in situ. As another example, cobalt bromide in the presence of acetic acid and ozone appears to form cobalt acetate in situ. It is further preferred that the cobalt salt correspond to the salt of the acid which is used as the reaction solvent. Since acetic acid is the preferred solvent, cobalt acetate is the most preferred catalyst. As indicated above, the molar ratio of catalyst to saturated cyclic hydrocarbon should be at least 5 millimoles per mole. It is preferred that the catalyst concentration be between 7 and 15 millimoles per mole of saturated cyclic hydrocarbon since maximum conversions and efficiencies are achieved when the catalyst to saturated cyclic hydrocarbon ratio is within this range. Increased amounts of catalyst can be employed, but provide no particular advantage.

It has been found further that in the oxidation of saturated cyclic hydrocarbons with an oxygen-containing gas there is a period of induction before the reaction begins to proceed. This period of induction is believed to occur in order to oxidize the cobaltous ion to the active cobaltic ion and to promote the production of free radicals from the saturated cyclic hydrocarbon. This induction period varies from one-half hour to three hours or more, depending upon the charge materials and the reaction conditions. It has been found that this induction period can be reduced by the addition of an initiator to the reaction mixture. It is believed that the function of the initiator is to form free radicals faster than the saturated cyclic hydrocarbon will form free radical and to act as an oxidant to convert the cobaltous ion to the active cobaltic ion. The initiator can be any compound which contains oxygen having a valence of minus one or compounds which on reacting with molecular oxygen will form compounds which contain oxygen having a valence of minus one. Such compounds include, for example, ozone; inorganic peroxides, such as sodium or hydrogen peroxide; organic peroxides, such as benzoyl peroxides; peracids, such as peracetic acid; aldehpdes, such as acetaldehyde; ketones, such as methyl ethyl ketone and cyclohexanone; and ethers, such as diethyl ether. It is preferred to employ cyclic hydroperoxides or cyclic ketones which correspond in carbon structure to the cyclic hydroperoxides and cyclic ketones produced in the reaction. The amount of initiator can vary between 0.1 to 20 weight percent based on the staturated cyclic hydrocarbon with preferred amounts of initiator being between 0.3 to 3 weight percent based on the saturated cyclic hydrocarbon.

If preferred, the oxidation of the cobaltous ion to the cobaltic ion can be done separately, in the storage tank, for example, before the catalyst is admixed with the saturated cyclic hydrocarbon. It is preferred to use ozone for this oxidation either alone or with another gas, such as oxygen, since it can be easily bubbled through a solution of solvent and catalyst. If ozone or one of the other initiators is used to separately oxidize the cobaltous ion, an amount between 0.01 to 3 moles of initiator per mole of catalyst should be employed with preferred amounts between 0.1 to 1 mole of initiator per mole of catalyst.

Any oxygen-containing gas can be employed in the process of this invention. By an oxygen-containing gas is meant a gas which contains free molecular oxygen. Examples of suitable oxygen-containing gases are oxygen itself or air. The partial pressure of oxygen over the reaction mixture should be at least 3 pounds per square inch absolute and can go as high as 1,500 pounds per square inch absolute, or higher. The preferred partial pressure of oxygen over the reaction mixture is between 10 and 100 pounds per square inch absolute. The total pressure should be at least sufficient to keep the reactants in the liquid phase. The total reaction pressure which is employed will depend to a large extent on the particular oxygen-containing gas which is used.

The reaction temperature can vary between 50° to 115° C. with preferred temperatures between 75° to 100° C. Temperatures below 50° C. result in undesirably low conversions. Temperatures above about 115° C. are undesirable as they tend to promote thermal decomposition of the cyclic hydroperoxides to the undesired cyclic alcohols, rather than the desired cyclic ketones. As a result, there is a decreased conversion of the saturated cyclic hydrocarbon to the desired diabasic acid.

The reaction mixture is preferably well agitated to insure better contacting of the reactants. Agitation can be provided by mechanical stirring devices aided by the ebullition caused by the introduction of the oxygen-containing gas below the surface of the liquid reaction mixture.

The reaction time can vary between one-half to ten hours or more with preferred reaction times of between 1.5 to six hours. These reaction times are in addition to any induction periods. The reaction conversion has been found to increase as the reaction time increases with no loss in efficiency, but the use of reaction times above ten hours is not recommended since the rate of increase of conversion at reaction times above ten hours is very small.

The process of this invention will be further described with reference to the following experimental work. The following procedure was employed for the experimental runs, unless otherwise indicated. A reaction mixture was formed by adding the solvent, catalyst, charge stock (which in all runs was cyclohexane), and initiator to a 350 milliliter glass reactor provided with a sparger for oxygen addition. Oxygen containing 2 percent ozone was passed through the sparger and into the reaction mixture at room temperature and atmospheric pressure until 0.001 mole of ozone was added. The reactor was then sealed and the pressure permitted to increase to 30 pounds per square inch absolute. The reaction mixture was heated to reaction temperature while oxygen was continuously passed therethrough at a rate of about 0.5 cubic feet per hour for the required reaction time. The reaction mixture was distilled to remove the unreacted cyclohexane and essentially all of the reaction solvent. The remaining hot liquid mixture consisting of the adipic acid, the catalyst and intermediate oxidation products, was cooled whereupon the adipic acid crystallized. This cooled mixture is termed the "crude adipic acid" in the following examples.

In most of the runs, a representative portion of this crude adipic acid was reacted with ethyl alcohol using a small amount of sulfuric acid as the catalyst to form the diethyl ester of the adipic acid. The esterified mixture was analyzed by gas-liquid chromatography and the amount of adipic acid calculated by reference to the chromatograph of a commercially pure diethyladipate in the known manner. The efficiency of the reaction is defined as the percent of cyclohexane reacted which is converted to adipic acid. Since the crude adipic acid represents essentially only the reacted cyclohexane, the percent of adipic acid in the crude adipic acid is taken to be the efficiency of the reaction.

EXAMPLE 1

In this example, 120 grams of acetic acid solvent; 0.1 gram (0.4 millimole) of cobaltous acetate $$Co(C_2H_3O_2)_2 \cdot 4H_2O$$

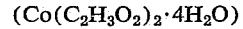

60 grams of cyclohexane; and 0.5 gram of cyclohexanone were added to the 350 milliliter reactor. There was no ozone addition in this run. The run was made at 105° C. for a reaction time of four hours. The reaction pressure was 33 pounds per square inch absolute. The molar ratio of solvent to cyclohexane was 2.80. The millimoles of catalyst per mole of cyclohexane was 0.56. No conversion of cyclohexane was detected.

EXAMPLE 2

Example 1 was repeated except 0.001 mole of ozone was added, the reaction temperature was decreased to 95° C., the reaction time was decreased to three and one half hours, and the catalyst concentration was increased to 0.5 gram (2 millimoles). The millimoles of catalyst per mole of cyclohexane was 2.8. The conversion of cyclohexane, calculated by dividing the weight of cyclohexane reacted by the total weight of cyclohexane charged, amounted to 8.5 weight percent. The weight of cyclohexane reacted was determined by subtracting the amount of recovered unconverted cyclohexane from the amount charged. Analysis of the esterified crude adipic acid product by gas-liquid chromatography indicated the product to be 61 percent adipic acid. This run is summarized on Table I below.

EXAMPLE 3

In this example, 150 grams of acetic acid solvent; 1.0 gram (4 millimoles) of cobaltous acetate; 63 grams of cyclohexane; and 1.9 grams of cyclohexanone were added to the 350 milliliter reactor. This run was also made at 95° C. for a reaction time of three and one half hours. The molar ratio of solvent to cyclohexane was 3.34. The millimoles of catalyst per mole of cyclohexane was 5.34. The conversion of cyclohexane was 27.5 weight percent based on the unreacted cyclohexane recovered while the efficiency based on analysis of the esterified crude adipic acid by gas-liquid chromatography was 73.8 percent. This run is also summarized on Table I below.

EXAMPLE 4

Example 3 was repeated except the catalyst concentration was increased to 8.0 millimoles of catalyst per mole of cyclohexane. The conversion of cyclohexane was 37.0 percent based on the unreacted cyclohexane recovered, while the efficiency based on analysis of the esterified crude adipic acid by gas-liquid chromatography was 74.8 percent. This run is also summarized on Table I below.

EXAMPLE 5

This run was the same as Example 3, except the molar ratio of solvent to cyclohexane was slightly reduced to 3.12 while the catalyst concentration was increased to 13.35 millimoles of catalyst per mole of cyclohexane. The conversion of cyclohexane based on the amount of unreacted cyclohexane recovered was 36.5 percent. The crude adipic acid was filtered and washed with 100 grams of a 25 percent solution of acetic acid in cyclohexane, and washed again with pure cyclohexane to produce a dry product, the melting point of which was 151.5°–152° C. The melting point of adipic acid is 151°–153° C. as given in "Handbook of Chemistry and Physics," Chemical Rubber Publishing Company, 36th Edition. The weight of adipic acid recovered was 29.8 grams. However, some additional adipic acid always remains in the filtrate. The filtrate was distilled to remove cyclohexane and acetic acid. A three to four gram portion of the remaining filtrate was then esterified by reaction with 200 milliliters of ethanol using 50 milliliters of toluene as the solvent and two drops of sulfuric acid as the catalyst. It was found that 12.7 weight percent of the remaining filtrate was adipic acid. The efficiency of conversion was therefore 75.3 percent. This run is also summarized on Table I below.

EXAMPLE 6

Example 2 was repeated except the catalyst concentration was increased to 14.0 millimoles of catalyst per mole of cyclohexane and the reaction pressure was 39 pounds per square inch absolute. The conversion of cyclohexane was 40.5 percent. The efficiency of the reaction based on the weight of recovered adipic acid was 72.4 percent. This run is also summarized on Table I below.

EXAMPLE 7

Example 4 was repeated except the catalyst concentration was increased to 26.7 millimoles of catalyst per mole of cyclohexane. The conversion of cyclohexane was 36.4 percent based on the unreacted cyclohexane recovered with an efficiency of 75.0 percent determined by gas-liquid chromatography analysis of the esterified crude adipic acid product. You will note that the conversion and efficiency of this run were about the same as the conversion and efficiency for Example 4 above. This run is also summarized on Table I below.

A comparison of Examples 1 through 7 shows that as the catalyst concentration increases, the conversion of cyclohexane also increases to a maximum of about 40 percent. Example 1 shows that the use of 0.56 millimole of catalyst per mole of cyclohexane is insufficient to promote the oxidation reaction.

Figure 1:
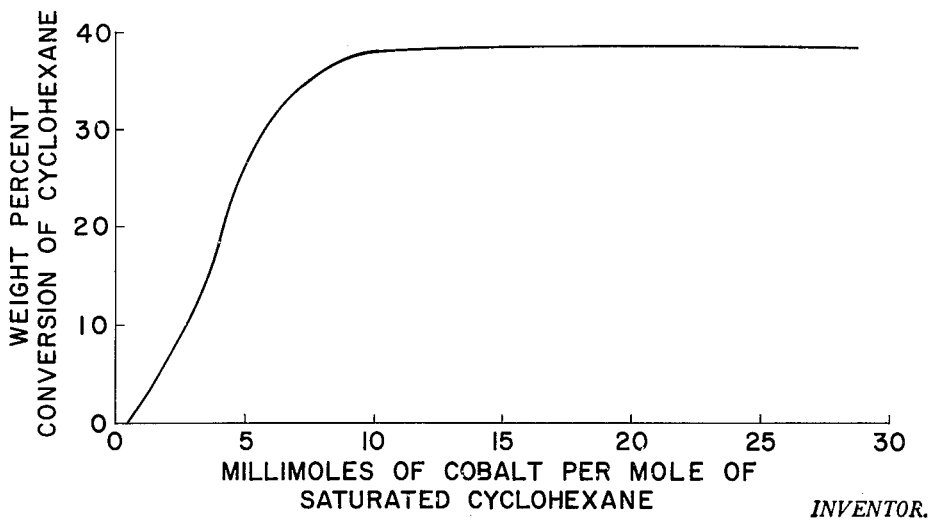

FIGURE 1 is a plot of the weight percent conversion of the cyclohexane versus the millimoles of cobalt acetate per mole of cyclohexane for Examples 1 through 7 above. This figure shows that to achieve desirable conversions of cyclohexane a catalyst concentration of at least three and one half millimoles of cobalt per mole of cyclohexane is required, whereas catalyst concentrations above about 15 millimoles of cobalt per mole of cyclohexane have no effect in improving the conversion of the cyclohexane.

EXAMPLE 8

Example 5 was repeated except the amount of solvent was slightly higher and the reaction time was increased to six hours. The cyclohexane conversion was 54.5 percent. The reaction efficiency as determined by analysis of the esterified crude adipic acid by gas-liquid chromatography was 74.1 percent. This run is also summarized on Table I below.

A comparison of Example 8 with Example 5 shows that increased conversions can be achieved at increased reaction times with essentially no reduction in reaction efficiency.

Table I

| Example Number | 1 | 2 | 3 | 4 | 5 | 6 | 7 | 8 |
|---|---|---|---|---|---|---|---|---|
| Charge materials— | | | | | | | | |
| Cyclohexane: | | | | | | | | |
| Grams | 60 | 60 | 63 | 63 | 63 | 60 | 63 | 63 |
| Moles | 0.71 | 0.71 | 0.75 | 0.75 | 0.75 | 0.71 | 0.75 | 0.75 |
| Acetic acid: | | | | | | | | |
| Grams | 120 | 120 | 150 | 150 | 140 | 120 | 150 | 150 |
| Moles | 2.0 | 2.0 | 2.5 | 2.5 | 2.34 | 2.0 | 2.5 | 2.5 |
| Initiators— | | | | | | | | |
| Ozone, moles | 0 | 0.001 | 0.001 | 0.001 | 0.001 | 0.001 | 0.001 | 0.001 |
| Cyclohexanone, grams | 0.5 | 0.5 | 1.9 | 1.9 | 1.9 | 0.5 | 1.9 | 1.9 |
| Catalyst—Cobalt acetate (millimoles) | 0.4 | 2 | 4 | 6 | 10 | 10 | 20 | 10 |
| Millimoles catalyst per mole of cyclohexane | 0.56 | 2.8 | 5.34 | 8.01 | 13.35 | 14.0 | 26.70 | 13.35 |
| Moles of solvent per mole of cyclohexane | 2.80 | 2.80 | 3.34 | 3.34 | 3.12 | 2.8 | 3.34 | 3.34 |
| Reaction Conditions— | | | | | | | | |
| Oxygen pressure (p.s.i.a.) | 33 | 30 | 30 | 30 | 30 | 39 | 30 | 30 |
| Temperature, °C | 105 | 95 | 95 | 95 | 95 | 95 | 95 | 95 |
| Reaction time, hours | 4 | 3.5 | 3.5 | 3.5 | 3.5 | 2.5 | 3.5 | 6.0 |
| Products— | | | | | | | | |
| Crude adipic acid, grams | <0.5 | 9.4 | 32.0 | 42.0 | 41.6 | 40.8 | 41.4 | 60.0 |
| Recovered unreacted cyclohexane, grams | 60 | 54.9 | 45.7 | 39.7 | 39.0 | 35.7 | 40.1 | 28.7 |
| Cyclohexane reacted, grams | None | 5.1 | 17.3 | 23.3 | 23.0 | 24.3 | 22.9 | 34.3 |
| Conversion [1] | 0 | 8.5 | 27.5 | 37.0 | 36.5 | 40.5 | 36.4 | 54.5 |
| Efficiency [2] | 0 | 61 | 73.8 | 74.8 | 75.3 | 72.4 | 75.0 | 74.1 |

[1] Calculated by dividing weight of cyclohexane reacted by weight of cyclohexane charged.
[2] Percent of cyclohexane reacted which was converted to adipic acid.

EXAMPLE 9

In this run 121 grams of cyclohexane, 71 grams of acetic acid solvent, 0.5 gram of cyclohexanone initiator and 2.5 grams of cobaltous acetate were the materials charged to the 350 milliliter reactor. The molar ratio of solvent to cyclohexane was 0.82. The reaction temperature was 95° C. and the reaction time was four hours. This run is summarized on Table II below. Only 6 percent of the cyclohexane was converted. The crude adipic acid product was not analyzed but it was solid and appeared to be of about the same consistency as the crude adipic acid products of Examples 2 through 7 above.

EXAMPLE 10

Example 9 was repeated except the molar ratio of solvent to cyclohexane was increased to 1.75 while the total weight of solvent plus cyclohexane was kept constant. This run is summarized in Table II below. The conversion of cyclohexane was 23.3 weight percent based on the amount of unreacted cyclohexane recovered. The crude adipic acid was treated in the same manner as in Example 5 above, except the filtrates were not treated to produce the esters. The amount of adipic acid recovered was 23.1 grams. The efficiency of conversion was therefore 68 percent. However, this efficiency figure is low since there will always be some adipic acid in the filtrate.

Recovery of the adipic acid from the filtrate should increase the efficiency to about the 75 percent level.

Comparing Example 10 with Example 9 shows that increasing the solvent to cyclohexane ratio from 0.82 to 1.75 resulted in a considerable increase in conversion from 6 percent to 23.3 percent.

EXAMPLE 11

Example 9 was repeated except the molar ratio of solvent to cyclohexane was increased to 2.88 while the total weight of solvent plus cyclohexane was kept constant. This run is also summarized in Table II below. The weight percent conversion of cyclohexane increased to 39.4 weight percent based on the amount of unreacted cyclohexane recovered. The crude adipic acid was treated in the same manner as in Example 5 above except the filtrates were not treated in producing the esters. The amount of adipic acid recovered was 29.6 grams. The efficiency of conversion was therefore 70 percent. However, this efficiency figure is low since there will always be some adipic acid in the filtrate. Recovery of the adipic acid from the filtrate should increase the efficiency to about the 75 percent level.

Comparing Example 11 with Examples 10 and 9 shows that increasing the solvent to cyclohexane ratio increases the conversion of cyclohexane without reducing reaction efficiency.

EXAMPLE 12

Example 9 was repeated except the molar ratio of solvent to cyclohexane was increased to 5.0, the reaction time was reduced to 3.5 hours and the initial ozone addition was 0.002 mole. Again, the total weight of solvent plus cyclohexane was maintained constant. The reaction appears to commence rapidly (within five minutes) on reaching reaction temperature. This run is also summarized on Table II below. The weight percent conversion of cyclohexane again increased to 46 percent. Efficiency based on analysis of the esterified crude adipic acid product by gas-liquid chromatography was 74.6 percent.

Comparing Example 12 with Examples 11, 10 and 9, shows that increasing the molar ratio of solvent to cyclohexane to 5.0 results in still further improvements in reaction conversion. The additional amounts of ozone did not appear to have any effect.

EXAMPLE 13

Example 9 was repeated except the molar ratio of solvent to cyclohexane was increased to 5.56 while the total weight of solvent plus cyclohexane was maintained constant. This run is also summarized on Table II below. The weight percent conversion of cyclohexane was 46.6 percent. The crude adipic acid product was not analyzed, but it was solid and appeared to be of about the same consistency as the crude adipic acid products of the above examples.

Comparing Example 13 with Examples 12 and 11, shows that the conversion of the charge stock appears to be maximizing at solvent to cyclohexane ratios of about 5:1.

The effect of the solvent to cyclohexane ratio on the weight percent conversion of cyclohexane can be seen more clearly on FIGURE 2. This figure shows that to achieve reasonable conversions of cyclohexane above about 10 percent a molar ratio of solvent to cyclohexane of at least 1.5:1 should be employed.

EXAMPLE 14

Example 12 was repeated except the reaction temperature was decreased to between 70° and 75° C., the initial ozone addition was 0.001 mole and the reaction time was extended to six hours. This run is also summarized on Table II below. The weight percent conversion of cyclohexane based on the amount of recovered unreacted cyclohexane was 17.1 percent. The efficiency of conversion based on the analysis of the esterified crude adipic acid by gas-liquid chromatography was 81 percent.

Comparing Example 14 with Examples 12 and 8, shows that a decrease in reaction temperature sharply decreases conversion even at the extended reaction time of six hours.

EXAMPLE 15

Example 12 was repeated except there was no initial addition of ozone. There appeared to be about a thirty minute induction period before reaction began. The weight percent conversion based on the amount of recovered unreacted cyclohexane was 36.9 percent. The efficiency of conversion based on the analysis of the esterified crude adipic acid product by gas-liquid chromatography was 76.1 percent. This run is also summarized on Table II below.

Comparing Example 15 with Example 12 shows that the elimination of the use of ozone to separately oxidize the cobaltous ion to the active cobaltic ion results in a thirty minute induction period before reaction begins.

EXAMPLE 16

Example 12 was repeated except the ketone initiator (cyclohexanone) was not added and the initial ozone addition was 0.001 mole. This run is also summarized on Table II below.

Comparing Example 16 with Example 12 shows the advantage of the use of an initiator. A very low conversion was obtained in Example 16 despite a good catalyst level and solvent to cyclohexane ratio. The low conversion was due to an induction period of about three hours.

EXAMPLE 17

In this run 120 grams of cyclohexane, 70.2 grams of acetic acid solvent, 2.97 grams of cyclohexanone and 0.01 gram of cobaltous acetate were the materials charged to the 350 milliliter reactor. There was no ozone addition in this run. The reaction temperature was held between 104° to 107° C. The reaction pressure was 33 pounds per square inch absolute. The molar ratio of solvent to cyclohexane was 0.82. The millimoles of catalyst per mole of cyclohexane was 0.03. There was no noticeable reaction after four hours.

Comparing Example 17 with Example 9 shows the effect, as did Example 1, of using catalyst levels below those recommended in this application. Example 9 shows the use of a low (0.82) solvent to cyclohexane ratio results in low conversions (6 percent) even at a catalyst level of about 7 millimoles of cobalt per mole of cyclohexane and a reaction temperature of 95° C. Example 17 shows the use of a low (0.82) solvent to cyclohexane ratio combined with a low catalyst level, i.e., 0.03 millimole of cobalt per mole of cyclohexane results in no reaction even at the increased reaction temperatures of 105° C.

EXAMPLE 18

In this run 150 grams (2.02 moles) of propionic acid acid were used as the solvent. The solvent was charged along with 63 grams (0.75 mole) of cyclohexane, 4.0 grams of cyclohexanone and 10 millimoles of cobaltous acetate to the 350 milliliter reactor. The total pressure was 30 pounds per square inch absolute. The run was continued for 3.5 hours at a reaction temperature of 95° C.

The crude adipic acid weighed 46 grams. This crude adipic acid was cooled to crystallize the adipic acid which was filtered, washed with 150 milliliters of a 25 weight percent mixture of acetic acid and cyclohexane and then with 200 milliliters of cyclohexane. The dried adipic acid weighed 31.5 grams and had a melting point of 151°–152° C.

Conversion based on the amount of recovered unreacted cyclohexane was 37.9 percent. The efficiency based on the amount of recovered adipic acid was 68.5 percent.

EXAMPLE 19

Example 11 was repeated except the solvent was isobutyric acid. This run is summarized on Table II. No adipic acid was produced in this run, which shows the adverse effect of employing a solvent containing a tertiary hydrogen atom in its structure.

EXAMPLE 20

Example 11 was repeated except no ozone was added, the reaction temperature was 90° C. and the catalyst was five millimoles of cobalt bromide. No reaction was noted after a four hour reaction period. This run is also summarized on Table II.

EXAMPLE 21

Example 20 was repeated except 0.002 mole of ozone was added initially to the reaction mixture. After a four hour reaction period, 26.5 weight percent of the cyclohexane was found to be converted. The crude adipic acid product was not analyzed, but it was solid and appeared to be of about the same consistency as the crude adipic acid in the above Examples 2 through 15.

Example 20 shows that cobalt bromide in the presence of cyclohexanone and acetic acid will not function to catalyze the oxidation of cyclohexane. Ozone (as shown in Example 21) is apparently necessary to catalyze the formation of an active cobalt salt, which is believed to be, again, cobalt acetate.

is at least 5 millimoles per mole and recovering a reaction product comprising an aliphatic dibasic acid having the same number of carbon atoms as said saturated cyclic hydrocarbon.

2. A process according to claim 1 wherein the saturated cyclic hydrocarbon is cyclohexane.

3. A process according to claim 1 wherein said saturated cyclic hydrocarbon has a total of between 4 and 11 carbon atoms per molecule.

4. A process for oxidizing a saturated cyclic hydrocarbon having from 4 to 8 cyclic carbon atoms per molecule and having hydrogen atoms attached only to primary and secondary carbon atoms with a gas containing molecular oxygen which comprises reacting at least one of said cyclic hydrocarbons under oxidation conditions including a temperature between 50° and 115° C. in the presence of a solvent which comprises a fatty acid having between 2 and 9 carbon atoms per molecule and which contains hydrogen atoms attached only to primary and secondary carbon atoms, an initiator which consists of a compound which contains oxygen having a valence of minus one and a catalyst consisting of a cobalt salt of an organic acid and in which process the molar ratio of said solvent to said saturated hydrocarbon is between 1.5:1 and 10:1 and in which process the molar ratio of said catalyst to said saturated cyclic hydrocarbon is at least 5 millimoles per mole and recovering a reaction product comprising an aliphatic dibasic acid having the same number of carbon atoms as said saturated cyclic hydrocarbon.

Table II

| Example Number | 9 | 10 | 11 | 12 | 13 | 14 | 15 | 16 | 17 | 18 | 19 | 20 | 21 |
| --- | --- | --- | --- | --- | --- | --- | --- | --- | --- | --- | --- | --- | --- |
| Charge Materials— | | | | | | | | | | | | | |
| Cyclohexane: | | | | | | | | | | | | | |
| Grams | 121 | 85.4 | 63 | 42 | 38.4 | 42 | 42 | 42 | 120 | 63 | 63 | 63 | 63 |
| Moles | 1.44 | 1.01 | 0.75 | 0.50 | 0.46 | 0.50 | 0.50 | 0.50 | 1.43 | 0.75 | 0.75 | 0.75 | 0.75 |
| Acetic Acid: | | | | | | | | | | | | | |
| Grams | 71 | 106.2 | 130 | 150 | 153.6 | 150 | 150 | 150 | 70.2 | [3]150 | [4]130 | 130 | 130 |
| Moles | 1.18 | 1.77 | 21.6 | 2.5 | 2.56 | 2.5 | 2.5 | 2.5 | 1.17 | 2.02 | 1.49 | 2.16 | 2.16 |
| Initiators— | | | | | | | | | | | | | |
| Ozone, moles | 0.001 | 0.001 | 0.001 | 0.002 | 0.001 | 0.001 | None | 0.001 | None | | 0.001 | None | 0.002 |
| Cyclohexanone, grams | 0.5 | 0.5 | 0.5 | 1.9 | 0.5 | 1.9 | 1.9 | None | 2.97 | 4.0 | 1.0 | 0.5 | 0.5 |
| Catalyst—Cobalt acetate (millimoles) | 10 | 10 | 10 | 10 | 10 | 10 | 10 | 10 | 0.04 | 10 | 10 | [5]5 | [5]5 |
| Millimoles catalyst per mole of cyclohexane | 6.95 | 9.9 | 13.35 | 20.0 | 21.75 | 20.0 | 20.0 | 20.0 | 0.03 | 13.35 | 13.35 | 6.67 | 6.67 |
| Moles of solvent per mole of cyclohexane | 0.82 | 1.75 | 2.88 | 5.0 | 5.56 | 5.0 | 5.0 | 5.0 | 0.82 | 2.7 | 2.0 | 2.88 | 2.88 |
| Reaction conditions— | | | | | | | | | | | | | |
| Oxygen pressure (p.s.i.a.) | 30 | 30 | 30 | 30 | 30 | 30 | 30 | 30 | 33 | 30 | 30 | 30 | 30 |
| Temperature, °C | 95 | 95 | 95 | 95 | 95 | 70–75 | 95 | 95 | 104–107 | 95 | 95 | 90 | 90 |
| Reaction time, hours | 4 | 4 | 4 | 3.5 | 4 | 6 | 3.5 | 3.5 | 4 | 3.5 | 4 | 4 | 4 |
| Products— | | | | | | | | | | | | | |
| Crude adipic acid, grams | 12.7 | 34.0 | 42.3 | 37 | 30.6 | 15.0 | 28.6 | | 0 | 46 | 0 | 0 | 28.3 |
| Recovered unreacted cyclohexane, grams | 113.7 | 65.5 | 38.2 | 22.7 | 20.5 | 34.8 | 26.5 | 39.2 | 120 | 39.1 | 63 | 63 | 46.3 |
| Cyclohexane reacted, grams | 7.3 | 19.9 | 24.8 | 19.3 | 17.9 | 7.2 | 15.5 | 2.8 | 0 | 23.9 | 0 | 0 | 16.7 |
| Conversion [1] | 6.0 | 23.3 | 39.4 | 46.0 | 46.6 | 17.1 | 36.9 | 6.7 | 0 | 37.9 | 0 | 0 | 26.5 |
| Efficiency [2] | | | 68 | 70 | 74.6 | | 81 | 76.1 | | | 68.5 | | |

[1] See footnote 1 of Table I.  [2] See footnote 2 of Table I.  [3] Propionic acid.  [4] Isobutyric acid.  [5] Cobalt bromide.

Resort may be had to such variations and modifications as fall within the spirit of the invention and the scope of the appended claims.

I claim:

1. A process for oxidizing a saturated cyclic hydrocarbon having from 4 to 8 cyclic carbon atoms per molecule and having hydrogen atoms attached only to primary and secondary carbon atoms with a gas containing molecular oxygen which comprises reacting at least one of said saturated cyclic hydrocarbons under oxidation conditions including a temperature between 50° and 115° C. in the presence of a solvent comprising a fatty acid having between 2 and 9 carbon atoms per molecule and which contains hydrogen atoms attached only to primary and secondary atoms and a catalyst consisting of a cobalt salt of an organic acid, and in which process the molar ratio of said solvent to said saturated cyclic hydrocarbon is between 1.5:1 and 7:1 and in which process the molar ratio of said catalyst to said saturated cyclic hydrocarbon 5. A process according to claim 4 wherein the saturated cyclic hydrocarbon is cyclohexane.

6. A process according to claim 4 wherein the molar ratio of said solvent to said saturated cyclic hydrocarbon is between 2:1 and 5:1, and wherein the molar ratio of said catalyst to said saturated cyclic hydrocarbon is between 7 and 15 millimoles per mole of saturated cyclic hydrocarbon.

7. A process according to claim 4 wherein the catalyst consisting of a cobalt salt of an organic acid is dissolved in at least a portion of said solvent to form a catalyst mixture, which mixture is thereafter contacted initially with at least a portion of said initiator in the presence of oxygen to convert the cobaltous ion to the cobaltic ion.

8. A process according to claim 4 wherein the catalyst consists of a cobalt salt of a fatty acid having between 2 and 9 carbon atoms per molecule.

9. A process according to claim 4 wherein the initiator consists of a cyclic ketone having the same number of cyclic carbon atoms as said saturated cyclic hydrocarbon and said catalyst consists of a cobalt salt of a fatty acid having between 2 and 9 carbon atoms per molecule.

10. A process according to claim 9 wherein the amount of said initiator is between 0.1 and 20 weight percent based on said saturated cyclic hydrocarbon.

11. A process for the preparation of adipic acid which comprises oxidizing cyclohexane with a gas containing molecular oxygen selected from the group consisting of oxygen and air at a temperature between 80° and 100° C. at an oxygen partial pressure between 10 and 100 pounds per square inch absolute in the presence of a solvent comprising acetic acid, a catalyst consisting of cobaltous acetate and between 0.1 to 20 weight percent of an initiator consisting of cyclohexanone based on the weight of cyclohexane and in which process the molar ratio of said solvent to cyclohexane is between 2:1 and 5:1 and in which process the molar ratio of said catalyst to said cyclohexane is between 7 to 15 millimoles per mole.

12. A process according to claim 11 wherein said cobaltous acetate is initially dissolved in at least a portion of said solvent and contacted with a gas comprising ozone.

13. A process for oxidizing a saturated cyclic hydrocarbon having from 4 to 8 cyclic carbon atoms per molecule and having hydrogen atoms attached only to primary and secondary carbon atoms with a gas containing molecular oxygen which comprises reaching at least one of said saturated cyclic hydrocarbons under oxidation conditions including a temperature between 50° and 115° C. in the presence of solvent comprising a fatty acid having between 2 and 9 carbon atoms per molecule and which contains hydrogen atoms attached only to primary and secondary carbon atoms, a catalyst consisting of a cobalt salt of an organic acid and an initiator consisting of a cyclic ketone having the same number of cyclic carbon atoms as said saturated cyclic hydrocarbon, and in which process the molar ratio of said catalyst to said cyclic hydrocarbon is at least 5 millimoles per mole and in which process the molar ratio of said solvent to said saturated cyclic hydrocarbon is between 1.5:1 and 7:1.

14. A process according to claim 13 wherein the saturated cyclic hydrocarbon is cyclohexane and wherein the initiator is cyclohexanone.

15. A process according to claim 13 wherein the catalyst is a cobalt salt of the fatty acid used as the solvent.

16. A process for the preparation of adipic acid which comprises oxidizing cyclohexane with a gas containing molecular oxygen at a temperature between 50° to 115° C. in the presence of a solvent comprising acetic acid, a catalyst consisting of cobalt acetate and an initiator consisting of cyclohexanone and in which process the molar ratio of said solvent to said cyclohexane is between 1.5:1 and 7:1 and in which process the molar ratio of said catalyst to said cyclohexane is at least 5 millimoles per mole.

References Cited by the Examiner

UNITED STATES PATENTS

| 2,223,493 | 12/1940 | Loder | 260—433 |
| 2,285,914 | 6/1942 | Drossbach | 260—531 |
| 2,920,087 | 1/1960 | Hay | 260—533 |

FOREIGN PATENTS 738,808   10/1955   Great Britain.

LORRAINE A. WEINBERGER, *Primary Examiner.*

CHARLES B. PARKER, LEON ZITVER, *Examiners.*

UNITED STATES PATENT OFFICE
CERTIFICATE OF CORRECTION

Patent No. 3,231,608 January 25, 1966

John Kollar

It is hereby certified that error appears in the above numbered patent requiring correction and that the said Letters Patent should read as corrected below.

Column 3, line 6, for "aldehpdes" read -- aldehydes --; columns 9 and 10, Table II, fourth column, line 4 thereof, for "21.6" read -- 2.16 --; column 11, line 27, for "reaching" read -- reacting --.

Signed and sealed this 13th day of December 1966.

(SEAL)
Attest:

ERNEST W. SWIDER
Attesting Officer

EDWARD J. BRENNER
Commissioner of Patents